United States Patent [19]

Stuart

[11] Patent Number: 5,651,051

[45] Date of Patent: Jul. 22, 1997

[54] CORDLESS COMMUNICATIONS SYSTEMS

[75] Inventor: Nicholas Fisher Stuart, Petersfield, England

[73] Assignee: Lucent Technologies Wireless Limited, Hampshire, United Kingdom

[21] Appl. No.: 500,856

[22] PCT Filed: Feb. 10, 1994

[86] PCT No.: PCT/GB94/00267

§ 371 Date: Sep. 15, 1995

§ 102(e) Date: Sep. 15, 1995

[87] PCT Pub. No.: WO94/18777

PCT Pub. Date: Aug. 18, 1994

[30] Foreign Application Priority Data

Feb. 12, 1993 [GB] United Kingdom ............ 9302846

[51] Int. Cl.$^6$ ............................................. H04M 11/00
[52] U.S. Cl. .................. 455/463; 455/566; 455/567; 455/462

[58] Field of Search .................... 379/58, 61, 63, 379/62, 251, 252, 372, 373, 375

Primary Examiner—Dwayne Bost
Assistant Examiner—Keith Ferguson
Attorney, Agent, or Firm—Wenderoth, Lind & Ponack

[57] ABSTRACT

A communications system for establishing radio transmission and reception between one or more base units and one or more portable units. Upon reception at a base unit of an incoming call a first callout signal is transmitted to one or more portable units by the base unit. This first call out signal does not contain any information about operating a ringing device located in each portable unit, however, when the sequence signal from the first portable unit to respond to the callout signal is received by the base unit, the base unit sends out a second callout signal. This second callout signal contains information which starts a ringing cadence off, at the beginning of the cadence, in the ringing device in the first portable unit to respond and thus there is always only a small delay between a base unit and a portable unit making contact and the portable unit beginning to ring.

3 Claims, 2 Drawing Sheets

CORDLESS COMMUNICATIONS SYSTEMS

The present invention relates to communications systems, and in particular to the digital time-division duplex radio communication system which is established between one of a plurality of portable units and one or more base units forming a cordless telephone system.

Figure 1:
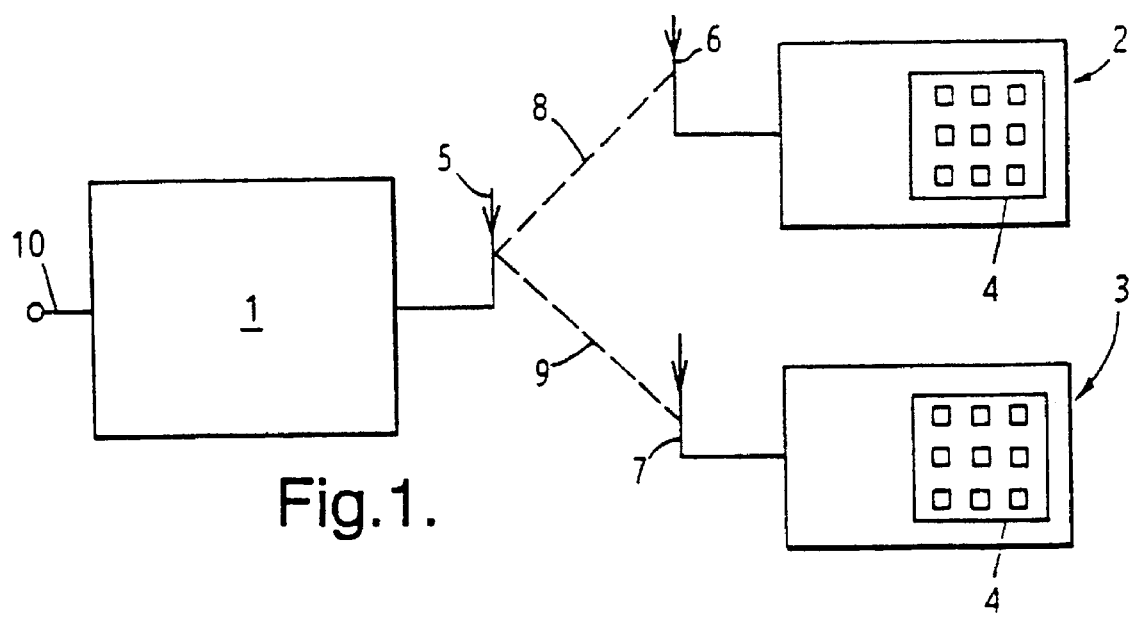

Such a system is shown, in its simplest form, in FIG. 1 of the accompanying drawings to which reference will now be made. The system illustrated comprises a fixed part in the form of a base unit 1, and two portable parts in the form of respective handsets 2,3. Each handset comprises an earpiece, microphone and keypad, this latter being shown diagrammatically under reference 4. In addition, each handset contains a respective radio transmitter/receiver (transceiver) and associated aerial 6,7 by which the handsets may communicate with the base unit by radio, as represented by the dotted lines 8,9. The base unit likewise contains a transceiver by which it communicates with the handsets, together with an aerial 5 for transmission and reception of radio signals from the handsets. The base unit also includes a hard-wired connection 10 to the external telephone system, and contains interface circuitry for interfacing the base unit transceiver to the external telephone line. Although only one base unit and two handsets are shown, this is to be taken as an example of the simplest system.

In such systems, the speech and other information to be transmitted between the or each base unit and the handsets is digitally encoded before transmission, is transmitted as a digital signal, and is decoded after reception to reproduce the original. A limited number (40 in the UK) of radio channels are allocated for the radio links 8,9 and it is clearly therefore preferable to utilise the same channel for both ends of a radio link—i.e. duplex communication. Each transceiver in the system will be able to transmit and receive on a number of these channels, if not all.

In digital second generation (CT2) cordless telephone systems, burst mode duplex is used to provide full duplex speech on a single channel. This essentially means that each transmitter has to compress the encoded speech from a particular time interval (called the burst period) down to just under half that interval (called the burst duration) in order to transmit the encoded speech and have time to receive the returning encoded speech in the other half of the burst period. This action is commonly called ping-pong transmission mode. It should be noted that the encoded speech corresponds to the speech from the entire burst period and on reception is expanded to its normal representation as continuous speech.

There has been established a common protocol for the exchange of signals, primarily control and synchronising signals, between the fixed and portable parts of the system. In the case of CT2, this protocol, known as a common air interface (CAI), is described in detail in international patent application WO90/09071. The present applicant's own air interface, a variant of the common air interface, is described in European patent application 0375361.

When an incoming call is received at the base unit, the base unit's transceiver transmits a callout signal to all of the handsets within range. This means that the handsets have to have their transceivers switched on in order to receive these transmissions which may, of course, come at any time. In practice, and in order to conserve handset battery life, the handsets automatically switch on their receivers at regular intervals, typically every 1.4 seconds. During the on period, the transceiver will scan, in receive mode, across the 40 allocated radio channels in turn, and will attempt to decode any signal being transmitted from the base unit. If no signal is received, the transceiver switches off, and the cycle is then repeated. If, however, a signal is detected, it is decoded to extract the following information: the number of handsets being called; its or their identification number; ring information; and display information. If the handset does not recognise its own identification number, it will switch itself off again, and the cycle is then repeated, as before.

The present invention is concerned particularly with that element of the decoded callout signal which contains the ring information. The handset's tone ringer is controlled from the decoded ring information as a series of Turn Ringer ON and Turn Ringer OFF commands, which constitute the cadence sequence, and which are controlled by a cadence generator which may be within the base unit. These commands are sent at regular intervals as a repeating sequence in order to generate the ring cadence emitted by the handset. In this way, plural handsets being called from one base unit will ring in sympathy. A typical cadence sequence example is normal telephone ringing, 400 ms Ring ON, 200 ms Ring OFF, 400 ms Ring ON followed by 2 seconds of Ring OFF. Once the base unit has started to transmit, from the beginning of the sequence, it should continue the regular intervals of Ring ON and Ring OFF information.

Typically a handset can automatically switch on and turn on its Tone Ringer within about 150 ms. However, a problem arises due to the random nature of the start time of the base unit callout transmission and the start time of the handset reception. The handset will switch on, more often than not, during the 2 seconds of Ring OFF. It will be able to respond to the callout signal immediately but the user will not hear any sound for up to 2 seconds. This delay before first ringing is undesirable and may be avoided by the use of the present invention wherein the cadence is controlled by the base unit.

European Patent Application No. 0 390 333 discloses a telecommunications system which allows multiple handsets, registered to multiple bases, to wake up, detect their ID's and then start ringing together on the second Ring ON cadence sequence received at the base from an external cadence generator. Thus the system allows synchronised multiple handset ringing. This is done by a base initiating a callout sequence in a manner which suppresses Ring ON signals from the external cadence generator and at the same time initiating a timer which matures after about 1.8 seconds. If all the handsets being called respond before the timer matures the timer is stopped and the Ring ON signals are transmitted from then on. If the timer matures the base allows Ring ON signals to be transmitted anyway. This system has the effect of delaying handset ringing for at least one cadence sequence.

According to the present invention there is provided a communications system for establishing radio transmission and reception between one or more base units and one or more portable units, each portable unit comprising a ringing device for providing ringing, each base unit comprising means for generating and transmitting a callout signal to all of the portable units within range upon reception at said base unit of an incoming call, said callout signal containing information about the identity of the portable unit or units being called and ringing information about when to activate the ringing device contained in each of said portable units, said ringing information being in the form of a Ring ON signal to activate said device or a Ring OFF signal to deactivate said device, wherein said means for generating and transmitting is operable to generate and transmit a first callout signal which contains said identity information, but does not contain any Ring ON signals, said system being characterised in that said means for generating and transmitting includes a controlled cadence generator which is operable to regulate the production of Ring ON and Ring OFF signals, in that said cadence generator is started as a result of receiving a response signal from a portable unit, and in that upon reception at said base unit of a response signal, from the first portable unit to respond to said first callout signal, said means for generating and transmitting ceases to generate and transmit said first callout signal, activates its cadence generator and generates and transmits a second callout signal, which is regulated by said cadence generator and which does contain Ring ON signals.

In an embodiment the base unit initially transmits a first callout signal which is modified to contain information about the number of handsets being called and their identification numbers only. When the first handset to respond is detected by the base unit the internal cadence generator is started at or near the beginning of the cadence sequence and the base unit begins to transmit a second callout signal which contains Ring ON and Ring OFF information, provided by the internal cadence generator, together with display information which the responding handset uses to create a display for viewing by a user of the handset. The effect is that a responding handset turns on and starts ringing almost immediately, at the beginning of the cadence sequence, with any associated indications appearing in sympathy.

Thus no Ring ON signals are transmitted until, when the first handset to respond is detected by the base unit, an internal cadence generator is started at or near the beginning of the cadence sequence causing Ring ON and Ring OFF information to be added to the base unit callout transmission.

Figure 2:
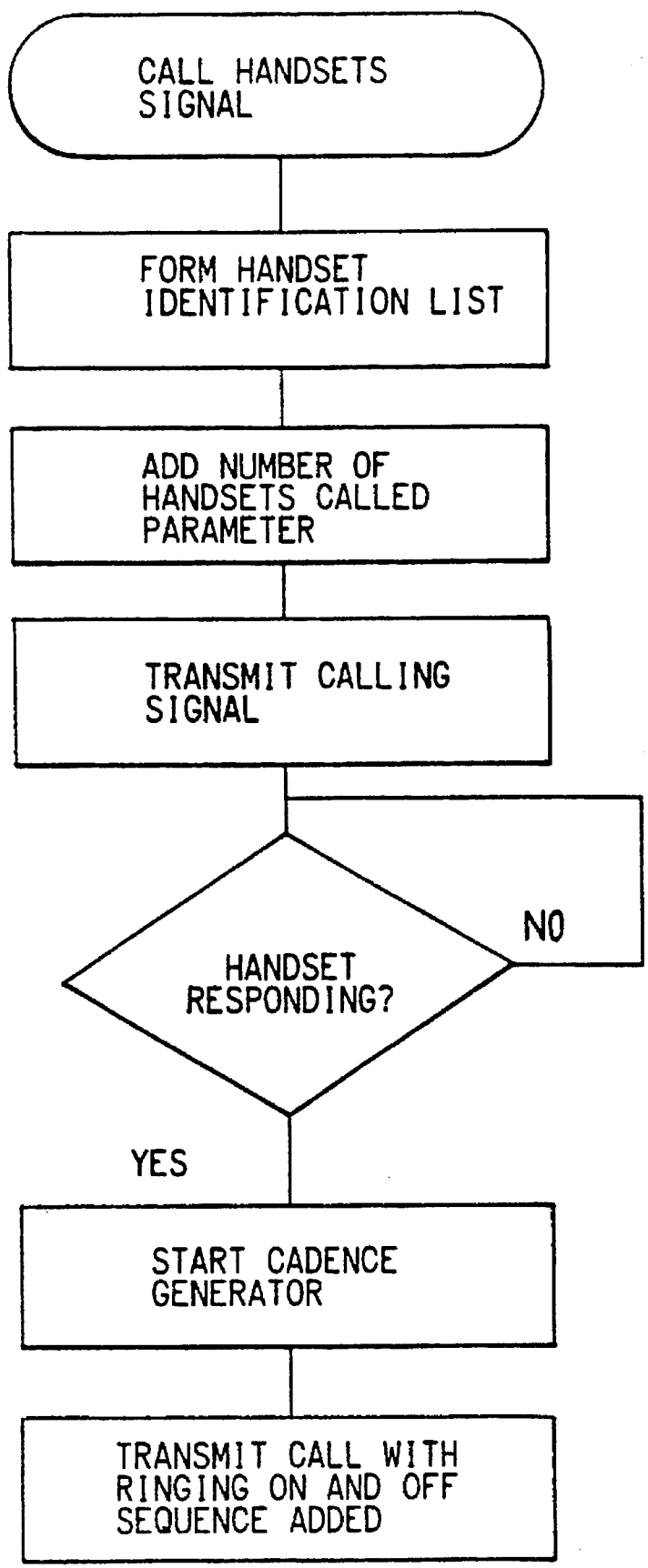

The functions of the system may be implemented by means of a software-programmed microprocessor. An example of a suitable algorithm is given in FIG. 2, which is self-explanatory.

I claim:

1. A communications system for establishing radio transmission and reception between one or more base units and one or more portable units, each portable unit comprising a ringing device for providing ringing, each base unit comprising means for generating and transmitting a callout signal to all of the portable units within range upon reception at said base unit of an incoming call, said callout signal containing information about the identity of the portable unit or units being called and ringing information about when to activate the ringing device contained in each of said portable units, said ringing information being in the form of a Ring ON signal to activate said device or a Ring OFF signal to de-activate said device, wherein said means for generating and transmitting is operable to generate and transmit a first callout signal which contains said identity information, but does not contain any Ring ON signals, said system being characterised in that said means for generating and transmitting includes a controlled cadence generator which is operable to regulate the production of Ring ON and Ring OFF signals, in that said cadence generator is started as a result of receiving a response signal from a portable unit, and in that upon reception at said base unit of a response signal, from the first portable unit to respond to said first callout signal, said means for generating and transmitting ceases to generate and transmit said first callout signal, activates its cadence generator and generates and transmits a second callout signal, which is regulated by said cadence generator and which does contain Ring ON signals.

2. A system as claimed in claim 1 wherein said controlled cadence generator commences its production of Ring ON and Ring OFF signals at or near the beginning of its cadence sequence.

3. A system as claimed in either one of the preceding claims wherein said means for generating and transmitting further comprises a display information element generator, said generator being activated by the response from the first responding portable unit, to transmit display information elements for use by the one or more portable units being called in order to create a display for viewing by the user of said portable unit.

* * * * *